United States Patent
Simonian et al.

(10) Patent No.: US 9,572,231 B2
(45) Date of Patent: Feb. 14, 2017

(54) SYNTHESIZING LIGHTING TO CONTROL APPARENT COLORS

(71) Applicant: Telelumen, LLC, Saratoga, CA (US)

(72) Inventors: Dmitri Simonian, Sunnyvale, CA (US); Steven Paolini, Saratoga, CA (US); Ross D. Archer, San Jose, CA (US); Lev Simonian, New York, NY (US)

(73) Assignee: Telelumen, LLC, Saratoga, CA (US)

( * ) Notice: Subject to any disclaimer, the term of this patent is extended or adjusted under 35 U.S.C. 154(b) by 311 days.

(21) Appl. No.: 14/069,899

(22) Filed: Nov. 1, 2013

(65) Prior Publication Data

US 2015/0123564 A1  May 7, 2015

(51) Int. Cl.
*H05B 37/02* (2006.01)
*H05B 33/08* (2006.01)

(52) U.S. Cl.
CPC ........ *H05B 37/0227* (2013.01); *H05B 33/086* (2013.01)

(58) Field of Classification Search
CPC ..... H05B 37/02; H05B 37/0227; H05B 33/08; H05B 33/086; H05B 33/0872
USPC ..................... 315/185 R, 291–297, 307, 308
See application file for complete search history.

(56) References Cited

U.S. PATENT DOCUMENTS

| | | | |
|---|---|---|---|
| 7,324,076 B2 | 1/2008 | Lee et al. | |
| 7,397,205 B2 * | 7/2008 | Huang | G09G 3/3413 315/152 |
| 7,529,004 B2 | 5/2009 | Debevec et al. | |
| 8,021,021 B2 | 9/2011 | Paolini | |
| 8,334,644 B2 | 12/2012 | Ramer et al. | |
| 2009/0323321 A1 | 12/2009 | Paolini | |
| 2013/0077299 A1 * | 3/2013 | Hussell | F21K 9/50 362/231 |
| 2013/0082622 A1 | 4/2013 | Tien et al. | |
| 2013/0268383 A1 * | 10/2013 | Paolini | H05B 33/086 705/26.1 |
| 2013/0307419 A1 | 11/2013 | Simonian | |

FOREIGN PATENT DOCUMENTS

WO    WO2009020484 A1    2/2009

\* cited by examiner

*Primary Examiner* — Jimmy Vu
(74) *Attorney, Agent, or Firm* — David Millers

(57) ABSTRACT

Illumination of an environment can be selected based on target colors that the illumination would provide for specific samples. One process for synthesizing the illumination includes repeatedly selecting settings for separate light sources in a luminaire system and determining a difference between the target colors of the samples and apparent colors of the samples under illumination that the luminaire system would produce with the settings selected. The differences thus determined can be used to identify a synthesized illumination, for example, the synthesized illumination that provides a smallest difference. A luminaire system can implement such a process in a luminaire or in a control system for luminaires.

18 Claims, 7 Drawing Sheets

| COLOR POINT (X, Y, Z) OF ILLUMINATION | COLOR POINT $(X_1, Y_1, Z_1)$ OF SAMPLE 1 | ... | COLOR POINT $(X_V, Y_V, Z_V)$ OF SAMPLE V |
|---|---|---|---|

1000

SYNTHESIZING LIGHTING TO CONTROL APPARENT COLORS

BACKGROUND

Objects often have different apparent colors when illuminated with different light sources. Clothing, for example, may appear to have different colors depending on whether the clothing is seen under LED lights, fluorescent lights, incandescent lights, sunlight, or moonlight. This can cause problems, for example, if a consumer buys clothing in one lighting environment and wishes to wear the clothing in another lighting environment. Advanced lighting systems or luminaires have recently been developed that have a programmable spectral power distribution and can mimic different light sources. See, for example, U.S. Pat. No. 8,021,021, entitled "Authoring, Recording and Replication of Lighting." Such luminaires may be programmed to produce a spectral power distribution that, within the range of visible light, closely reproduces the spectral power distribution of a target light source. These luminaires may include multiple light channels with each light channel having a separately adjustable intensity or power setting, and each light channel may produce light with a spectral power distribution that differs from the spectral power distributions of the other light channels. The programming or control of the separate intensities of the lighting channels can cause the lighting channels to collectively replicate the spectral power distribution of a target light source. However, the fidelity of the replication will generally depend on factors such as the number of independently controlled light channels and respective frequency or wavelength ranges of the light channels. For example, a light source having three light channels, e.g., red, blue, and green, may be able to produce white light, but the spectral power distribution of the white light may be a grossly inaccurate reproduction of the spectral power distribution of a target white light source. The inaccuracy of the replication of a target light source can result in particular items not having the apparent color that the items would have under the target light source.

SUMMARY

In accordance with an aspect of the invention, a lighting technique for an environment or scene can select or synthesize the spectral power distribution of light from a lighting system based on the target colors or appearance of particular samples or objects. Synthesis of the light may also account for the capabilities of an available luminaire system, so that the lighting from the luminaire system may best achieve the target colors or appearance of the samples. For example, the target color points associated with the samples may be color points that correspond to the apparent colors of the samples in a particular target illumination, e.g., under sunlight, but instead of attempting to replicate the target illumination, the lighting technique synthesizes a spectral power distribution that best reproduces the target color points. With this lighting technique, a luminaire system with relatively few light channels can illuminate an environment or scene and give the objects in the environment appearances closest to the desired appearances.

In one specific implementation, a method includes: selecting a set of target colors respectively for a set of samples; and finding settings for light sources in a luminaire system. The setting may be selected based on differences between the target colors of the samples and apparent colors of the samples under illumination that the luminaire system would produce with the settings selected.

Another implementation is a method of operating a luminaire system for illuminating an environment. The method includes selecting a set of target colors respectively for a set of samples, identifying a synthesized illumination resulting from light sources in the luminaire system producing respective intensities, and driving the light sources to produce the synthesized illumination to illuminate the environment. Identifying the synthesized illumination may include determining or minimizing a difference between the target colors of the samples and apparent colors of the samples under illumination from the luminaire system.

Yet another implementation is a luminaire system that includes multiple light sources. A processing unit of the luminaire system may be configured to determine driving signals for the light sources based on differences between target colors respectively of a set of samples and apparent colors respectively of the samples under illumination from the light sources. A driver in the luminaire system can then apply the driving signals to the light sources.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

The spectral power distribution for illumination of an environment such as a room or other area can be synthesized according to the capabilities of a lighting system that illuminates the environment and the color points desired for a set of samples. In particular, a synthesis process can identify and set the operational parameters of a luminaire system, e.g., drive levels, to minimize a measure of the difference between the target color points for specific samples and the color points that the samples would have under synthesized illumination from the luminaire. The target color points may depend on a goal for the illumination. For example, the color points may correspond to the appearance of the samples under a target illumination, or the color points may be chosen to achieve an aesthetic goal. The synthesis process can also take account of a target illumination by constraining the synthesized illumination to have a color point the same or nearly the same as the color point of the target illumination.

Figure 1:
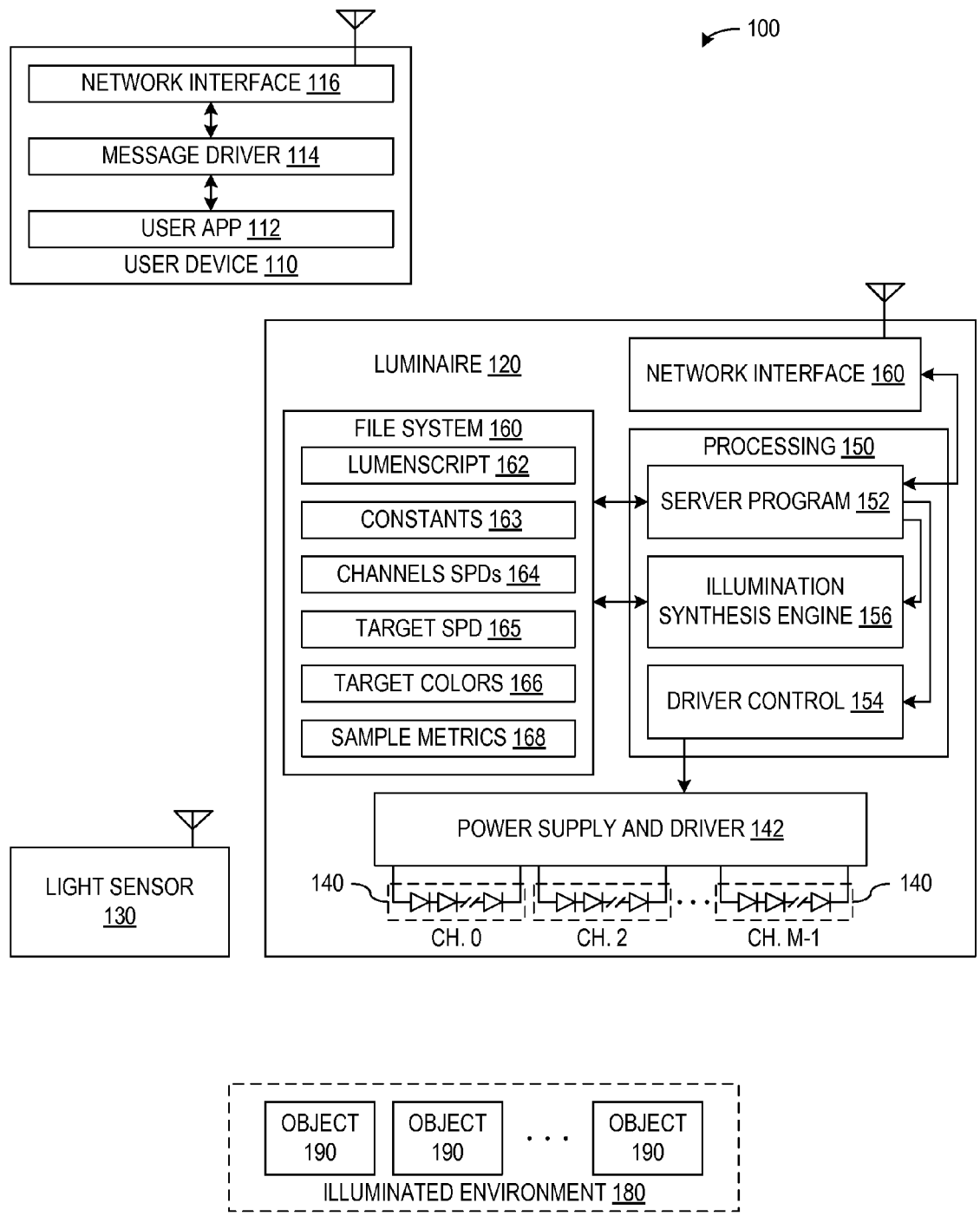
FIG. 1 shows an implementation of a luminaire system including a luminaire capable of synthesizing and producing illumination for an environment.

FIG. 1 illustrates a luminaire system 100 for illuminating an environment 180 containing a set of objects 190. As described more fully below, the apparent color of each object 190 to the human eye will generally depend on a color metric, i.e., a spectral reflectance or spectral transmittance, of that object 190 and the spectral power distribution of the light that illuminates the object 190. As a result, each object 190 has a range of apparent colors that can be rendered by appropriate illumination. Luminaire system 100 may operate to provide target colors to objects 190 or provide target colors to samples other than objects 190, provided that the target colors are achievable and consistent.

Objects 190, in general, can be anything that reflects or transmits light. For example, objects 190 may be products or produce displayed for sale or other commercial purpose, dabs of paint or pigment on a work of art, articles of clothing, plants, flowers, colored glassware, or room furnishings. In one case, objects 190 are color samples that have optical metrics defined by a public standard and that are used to calibrate or set the illumination of environment 180 as described further below. For example, the color samples may be any samples with reflectances or transmittances that may have been measured or are known from literature, e.g., a Quality Color Scale (QCS) set.

Luminaire system 100 includes a user device 110, one or more luminaires 120, and in some implementations, a light sensor 130. User device 110 is a control device and may be a computing device such as a personal computer, a laptop computer, a pad computer, a smart phone, or a custom control device. In one implementation, user device 110 implements a user app 112 that may provide a user with indicators of the status of luminaire system 100 and may allow the user to control luminaire system 100. For example, user app 112 may inform the user of the types, configurations, and current statuses of luminaires 120 in system 100 and may allow the user to download, select, synthesize, or activate lighting scenarios that may be implemented through luminaire system 100. User device 110 may also include a message driver 114 that formats communications according to the protocol or protocols used in luminaire system 100 and a network interface 116 including communication hardware such a WiFi, Bluetooth, or other transceivers capable of communicating with luminaires 120.

Sensor 130 may be an independent device having its own network interface (not shown), e.g., for communication with user device 110, luminaire 120, or other devices. Alternatively, light sensor 130 could be embedded within user device 110, luminaire 120 or another device such as a server (not shown). When light sensor 130 is embedded in another device, that device may provide network interface through which light sensor data can be communicated, or in some cases, a network communication of sensor data may not be required. In general, light sensor 130 is optional, and the location and use of a light sensor in a luminaire system may be implementation-dependent.

Each luminaire 120 may be a lighting fixture that produces light having a spectral power distribution that varies according to the lighting scenario implemented for lighting of environment 180. In the illustrated embodiment, luminaire 120 includes multiple light channels 140 where each light channel 140 produces a different spectral power distribution. In the illustrated embodiment, luminaire 120 includes M light channels 140, sometimes referred to herein as light channels 0 to (M−1). Each light channel 140 may, for example, include a set of light sources such as LEDs. Further, each light channel 140 may contain different types or combinations of light sources, so that different light channels produce different spectral power distributions. In one implementation, light channels 0 to (M−1) produce different narrow-band colored light with peak intensities at different wavelengths, e.g., with lower numbered light channels producing lower frequency or longer wavelength light than do the higher numbered light channels. Alternatively, one or more of light channels 140 may be a broadband or white light source. For example, light channels 140 could include a white, off-white, amber, green, or lime phosphor-converted LED. Alternatively, a light source for one or more light channel 140 could be formed as a combination of connected LEDs, for example, serially connected red LEDs with different peak wavelengths.

A processing system 150 in light source 120 may include conventional systems such as a processor and memory configured to control a power supply and driver 142 in order to select the respective light intensities emitted from channels 0 to (M−1). In particular, driver 142 may control a drive level for a light channel 140 by controlling the amplitude and/or duty cycle of the power supplied to the light source or sources in the light channel 140. The spectral power distribution of illumination from luminaire 120 may thus depend on the combination of drive levels or signals selected for light channels 140 by processing system 150, and as a result, luminaire 120 can produce a wide variety of spectral power distributions and produce lighting scenarios in which the spectral power distribution from luminaire 120 changes over time and/or varies spatially.

FIG. 1 shows an example implementation in which processing system 150 executes a server program 152, a driver control 154, and an illumination synthesis engine 156. Server program 152 may control a file system 160 for luminaire 120 and control data communications with other devices such as user device 110, other luminaires 120, or light sensor 130. Driver control 154 may be adapted for operation of light channels 140 and power supply and driver 142 to set the drive levels that control the intensity of light from light channels 0 to (M−1).

Illumination synthesis engine 156 in luminaire 120 may be employed to determine operating parameters, e.g., parameters for driver control 154 or drive signals from driver 142, that best achieve specific illumination goals as described further below. In particular, illumination synthesis engine 156 may cause luminaire 120 to produce lighting according to a scenario or goals defined by lighting control data. Such lighting control data may be loaded into luminaire 120 as a result of commands from user device 110. In the configuration of FIG. 1, result of illumination synthesis engine executing a synthesis process represented by the control data may be a lumenscript 162 that indicates sequences and timing of the drive levels for light channels 140.

In some particular lighting synthesis processes described further below, illumination engine 156 can synthesize illumination such that a set of samples when under the synthesized illumination would have apparent colors close to target colors for the samples. For such a process, illumination synthesis engine 156 may use data including system constants 163, channel spectral power distributions 164, a target spectral power distribution 165, target color points 166 of samples; and optical metrics 168 of the samples. System constants 163 may include constants that are generally applicable to many illumination synthesis problems. For example, system constants 163 may include representations of color matching functions (CMFs), which as described below may be used determine color points corresponding to spectral power distributions. Each channel spectral power distributions 164 may represent the shape of the spectral power distribution that a corresponding light channel 140 generates, and channel spectral power distributions 164 may be set at a factory or during a most-recent calibration of luminaire 120. Accordingly, channel spectral power distributions 164 may be specific to the type of luminaire 120 or to the specific luminaire 120. Target spectral power distribution 165, which may only be relevant for some synthesis processes described herein, represents the spectral power distribution of a target illumination and may be provided to illumination synthesis engine 156 in lighting control data that is loaded into luminaire 120 to represent a goal of the synthesized illumination. Target color points 166 represent the desired colors of samples and may be tristimulus values described further below. Target color points 166 may be provided to illumination synthesis engine 156, e.g., through lighting control data representing goals for the synthesized illumination or may be calculated by illumination synthesis engine 156 during an illumination synthesis process. Optical metrics 168 of the color sample set may represent the respective spectral reflectances or transmittances of the samples having target color points 166. Optical metrics 168 may be constants associated with a standard sample set, provided to illumination synthesis engine 156 with lighting control data defining the goals of a synthesis process, or determined as a result of a measurement process, e.g., using light sensor 130. Illumination synthesis engine 156 can use such data or constants 163 to 168 in a process that determines operating parameters for a synthesized illumination to achieve desired goals such as causing samples to have target colors.

Figure 2:
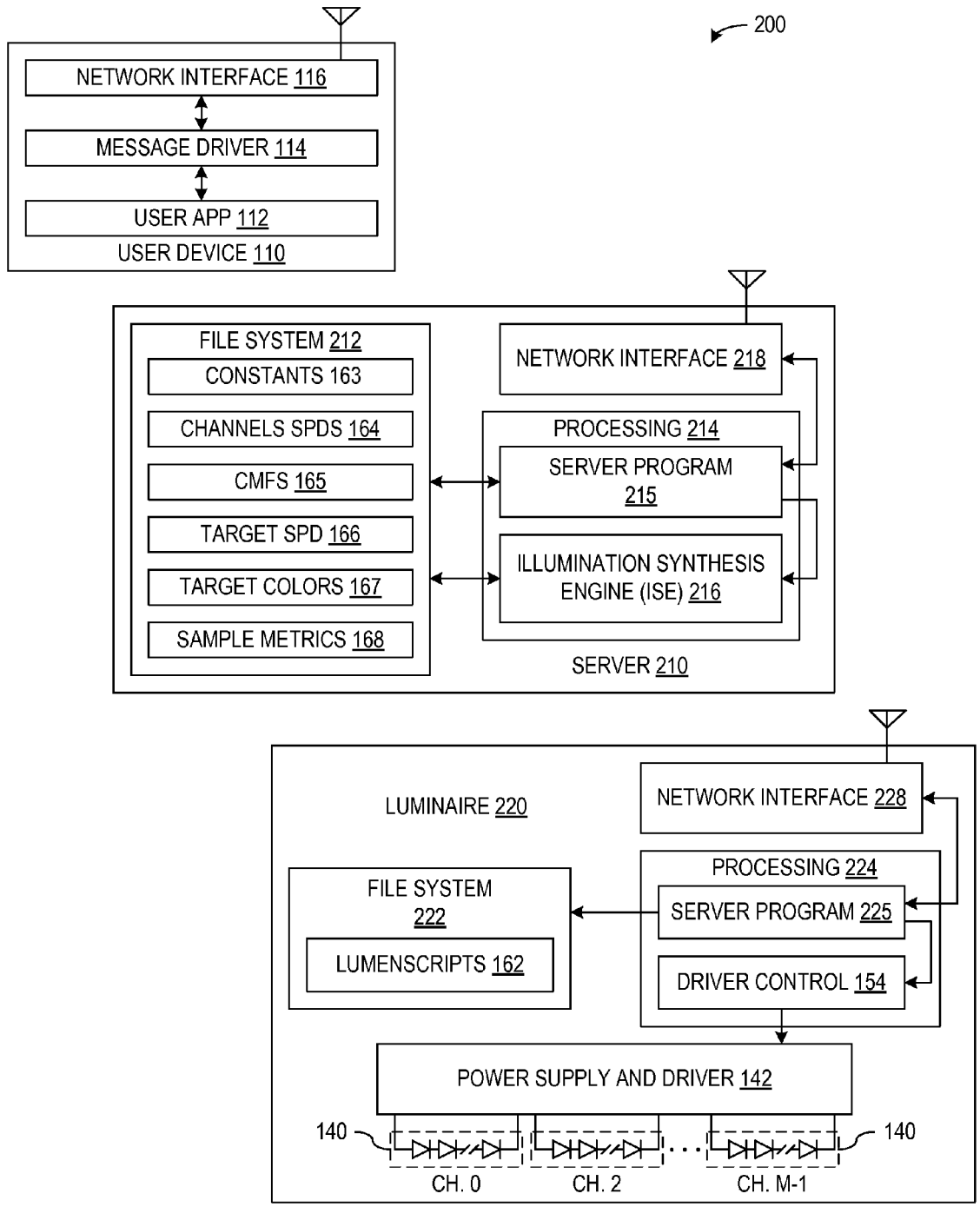
FIG. 2 shows one implementation of a luminaire system including a server capable of synthesizing illumination that one or more luminaires produce for an environment.

The luminaire system of FIG. 1 includes a smart luminaire 120 including illumination synthesis engine 156. Alternatively, the process of illumination synthesis may be performed in other processing devices, e.g., in user device 110 or by an external service. FIG. 2, for example, shows a luminaire system 200 in accordance with an implementation employing a server 210 capable of executing illumination synthesis. In the illustrated implementation of FIG. 2, luminaire system 200 includes a user device 110, server 210, and one or more luminaires 220. User device 110 may be identical to user device 110 of FIG. 1 and particularly can provide a user with an interface for controlling luminaire system 200.

Server 210 provides the processing power necessary to execute a server program 215 and an illumination synthesis engine 216. In particular, server program 215 controls a file system 212 and controls communications through a network interface 218, for example, to receive lighting control data from user device 110 and to send a lumenscript 162 to luminaire 220. Network interface 218 may use a common network for communication with user device 110 and luminaire 120 or may use separate networks, one for communication with user device 110 and another for communication with luminaires 120.

Illumination synthesis engine 216 performs an illumination synthesis process in response to lighting control data and may use constants 163, channel spectral power distributions 164 for luminaire 220, color matching functions 165, a target spectral power distribution 166, target colors 167 for samples, and optical metrics 168 for the samples. Server 210 may, for example, may be a general purpose computer with a processor and memory suitable for program code that when executed performs the functions of server program 215 and illumination synthesis engine 216. In some implementations, the functions of user device 110 and server 210 of FIG. 2 may be integrated into a single computing device.

An advantage of employing server 210 in luminaire system 200 when compared to luminaire system 100 of FIG. 1 is that the processing requirements of each luminaire 220 may be less so that less expensive luminaires 220 may be employed. Each luminaire 220 employs a processing system 224 executing a server program 225 and a driver control 154. Server program 225 can control a network interface to communicate with server 210 and download a lumenscript 162 to a file system 222 in luminaire 220. Lumenscript 162 can then indicate a sequence and timing of drive signals that driver control 154 uses to control power supply and driver 142 for light channels 140. Luminaire 220 does not need to execute an illumination synthesis engine or synthesize illumination to achieve a user's lighting goals.

One goal for synthesized illumination generated by the illumination synthesis engine in server 210 of FIG. 2 or in luminaire 120 of FIG. 1 may be to approximate the appearance of a set of color samples under a target illumination. The target illumination, which may or may not be white light, could, for example, be natural light such as light from the sun or sky under certain atmospheric conditions, e.g., fog, dark clouds, sunset in a smoggy valley, sunlight filtered through trees. The target illumination in another example could provide the spectral power distribution associated with a particular type of artificial lighting, e.g., incandescent or fluorescent lighting. The target illumination in another example could provide the spectral power distribution associated with a particular type of lighting not easily available, for example, light radiated of a red dwarf star, or sunlight reflected by a planet. In one attempt at synthesizing lighting that provides the apparent colors found under a target illumination, illumination synthesis engine 156 or 216 could attempt to identify respective intensities for light output from light channels 140 so that the light from light channels 140 collectively provide an approximation of the target illumination spectrum. Such approximation is most commonly identified by minimizing the sum of square differences between target and approximated spectra at each wavelength. However, the accuracy of the approximation of the target illumination typically depends on the number M of light channels 140 and/or characteristics such as the wavelength resolution of light channels 140. In a case in which luminaire 120 has a modest number of light sources, e.g., four to six light channels, the best approximation of the target illumination spectrum that luminaire 120 can produce may be significantly different from the target illumination, and the appearance of the color samples under the approximated illumination may be substantially different from the appearance of the color samples under the target illumination. In other words, with a modest number of independently controllable light channels, achieving the smallest difference between the spectral power distributions of the target illumination and an approximated illumination may not at the same time provide the smallest possible difference between apparent colors of samples under target and approximated illumination.

An alternative process for synthesizing illumination under which objects or samples have appearances more similar to their appearances under a target illumination directly considers or minimizes the differences between the colors of the samples under the synthesized illumination and the colors of the samples under the target illumination. As a result, illumination synthesis engine 156 or 216 or another processing system may synthesize illumination that achieves the best appearance of the samples but may differ from the best approximation of the target illumination spectrum that luminaire 120 could achieve.

Figure 3:
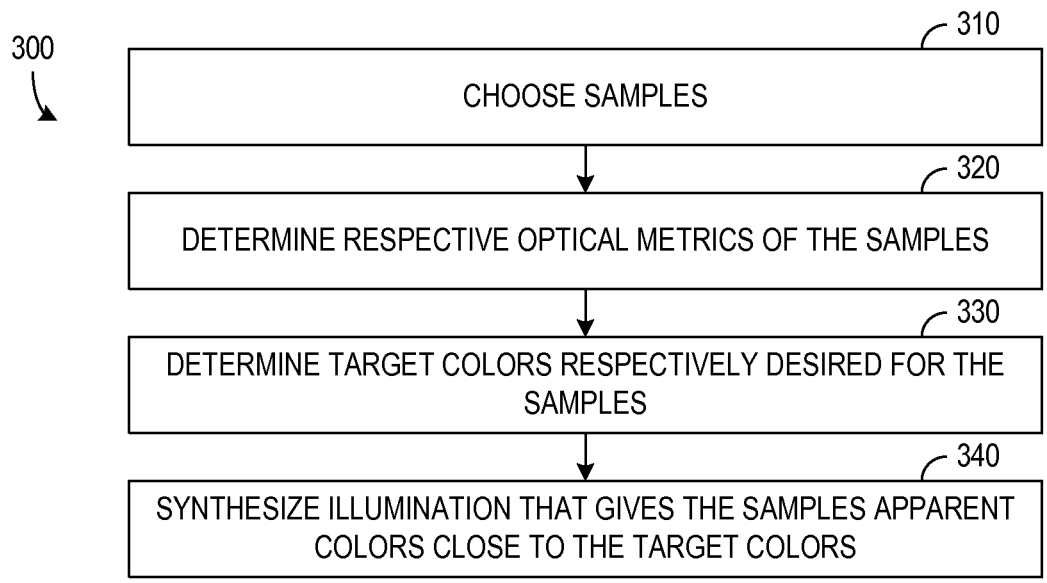
FIG. 3 is a flow diagram of a process for synthesizing illumination from a luminaire system.

FIG. 3 is a simple flow diagram of a process 300 for synthesizing illumination that gives desired apparent colors to samples. Process 300 includes blocks 310 and 320 that respectively choose a set of samples and determine the respective optical metrics of the samples. The samples may be chosen in a variety of ways.

The samples may be a set of objects in the environment to be illuminated, e.g., objects 190 in environment 180 of FIG. 1. For example, the samples may be the objects for which a synthesized illumination is sought to give the objects in the illuminated environment a particular aesthetic appearance, e.g., to emphasize, deemphasize, or otherwise affects the appearance of the objects. Commercially, products such as apples, carrots, or lettuce may have desired red, orange, or green colors that consumers find appealing, and the products may be the samples for which the synthesized illumination provides apparent colors that are the same as the appealing target colors. Alternatively, samples that are not objects in the illuminated environment or that will not remain in the illuminated environment may be representative of the environment or the desired illumination. In particular, samples may be selected that are representative of or related to the particular objects that may be in the environment or may come into the environment. In yet another alternative, the samples could be fixed for a luminaire system and chosen, for example, during manufacture of the luminaire system for the purpose of defining spectral distributions with compact representations that are luminaire-independent. In such cases, the representative samples may be, for example, color samples having characteristics, e.g., reflectances, defined under a public standard.

An optical metric such as a reflectance or transmittance for a sample determined in block 320 may be given by a function or a lookup table or vector relating the frequency or wavelength of the illumination to the fraction of light reflected or transmitted by the sample at that frequency or wavelength. In some implementations, the samples may be available for measurement, e.g., are in the environment illuminated by the luminaire system, and the reflectance or transmittance of each sample may be measured. In luminaire system 100 of FIG. 1, a process for measuring the reflectance or transmittance of a sample can coordinate the spectral content of light from luminaire 120 with measurements sensor 130 takes of light reflected from the sample or transmitted through the sample.

A block 330 identifies or determines the target apparent colors for the samples, and a block 340 finds a synthesized illumination. The synthesized illumination ideally has a spectral power distribution that would cause the samples to appear to have the target colors. However, in general, a synthesized illumination that exactly provides the target colors for all samples may not be possible, and the synthesized illumination may give the samples apparent colors that according to some measure are as close to the target colors. In one implementation, finding the synthesized illumination in block 340 involves a process of minimizing a difference between the target colors and the apparent colors of the samples under constraints such as the performance limits defined by the capabilities of the luminaire system creating the synthesized illumination. For example, the illumination that luminaire system 120 of FIG. 1 can provide may be limited by the number M of light channels in the luminaire system, the spectral power distributions 164 of light channels 140, and available values of drive levels for light channels 140. Other constraints may be placed on a minimization process such as a constraint on the color point or color temperature of the synthesized illumination.

Figure 4:
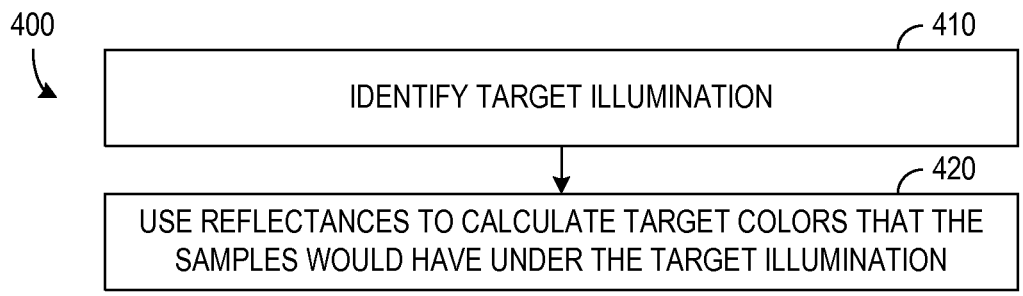
FIG. 4 illustrates a process that identifies the target colors of samples based on the appearance of the samples under a target illumination.

The target colors identified in block 330 may be selected in many ways depending on the goal or purpose of the synthesized illumination. For example, a user may directly select the target colors according to his or her personal preferences. Alternatively, FIG. 4 illustrates a process 400 using a target illumination in identifying the target colors for samples. The target illumination identified in a block 410 may be any illumination having a defined spectral power distribution and may particularly be a frequently encountered type of illumination, e.g., natural light such as light from the sun or sky under certain atmospheric conditions, e.g., fog, dark clouds, sunset in a smoggy valley, sunlight filtered through trees or a particular type of artificial light such as light from a camp fire, candle, oil lamp, incandescent bulb, fluorescent light, or sodium-vapor lamp. In one very specific implementation, a person choosing an item such as clothing to wear or purchase may select a target illumination based on the lighting under which the item may be used. In such cases, a goal for the synthesized illumination may be that the synthesized illumination would cause the samples, e.g., cloth or dye samples related to the item being viewed, to have apparent colors that are the same or nearly the same as the colors that the samples would appear to have under the target illumination.

A block 420 of process 400 uses the optical metrics of the samples and the target illumination to calculate or otherwise determine the desired colors. In particular, the spectral power distribution of light reflected from the sample when under the target illumination is a product of the spectral power distribution of the target illumination and the spectral reflectance of the sample. The target color corresponds to the apparent color of the light reflected from the sample, and as described below, the target color can be represented as a tristimulus value having three coordinates, in accordance with the fact that three types of cone cells in the typical human eye are stimulated by light reflected from or transmitted through an object.

Figure 5:
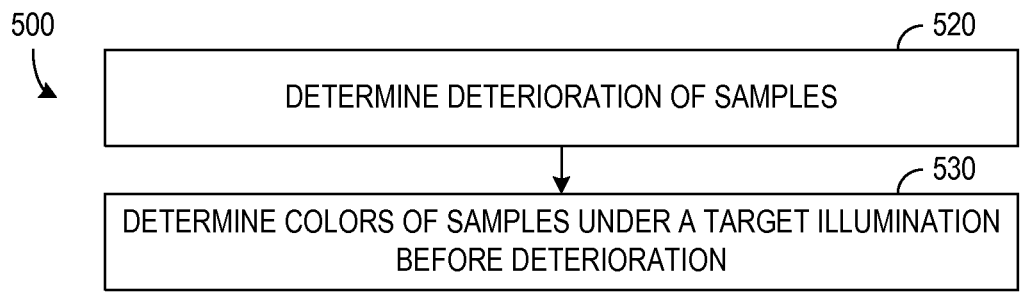
FIG. 5 illustrates a process that identifies the target colors of samples based on deterioration or fading of the samples.

FIG. 5 is a block diagram of a process 500 that determines the target colors for samples in order to compensate for deterioration or other changes in the optical properties of the samples. For example, a work of art, a fabric, or any other object may contain pigments that have changed, e.g., faded, for some reason, e.g., aging or environmental factors, and it may be possible to choose the target colors to provide objects with apparent colors resembling their colors before the deterioration. The example implementation of FIG. 5 begins with a block 510 that determines the changes or deterioration in the reflectances or transmittances of a set of samples. For example, the reflectances of a set of dabs of different color paints in a painting may be measured and compared to reflectances for new paint containing identical composition or pigments. Block 520 can identify the target colors as the colors the samples would have under a target illumination before the deterioration or other change, e.g., when the samples were new. The changed reflectances measured for the samples can subsequently be used in an attempt to synthesize illumination that gives the samples their target colors, e.g., the original or fresh colors. In an ideal case, synthesized illumination may be able to restore the appearance of a painting which has deteriorated to the original appearance the painting had when freshly painted. In some cases, deterioration does not permit restoration of all deteriorated colors, but partial restoration of some deteriorated colors may still be possible.

Synthesis of the illumination as in step 340 of FIG. 3 as noted above may be performed as a process for minimizing the difference between the target colors and apparent colors under illumination by the available luminaire system. Many techniques for using computers or computing systems to solve minimization problems with constraints are known in the art of optimization and could be employed when synthesizing illumination. As an example, a synthesis process could begin with some initial settings of drive levels of independently controllable color channels of a luminaire and randomly or systematically alter the drive level settings. One type of minimization process evaluates difference between the target colors of the samples and the apparent colors under illuminations corresponding to the settings of the drive levels, and the evaluated illumination that provides a smallest difference can be selected as the synthesized illumination.

Figure 6:
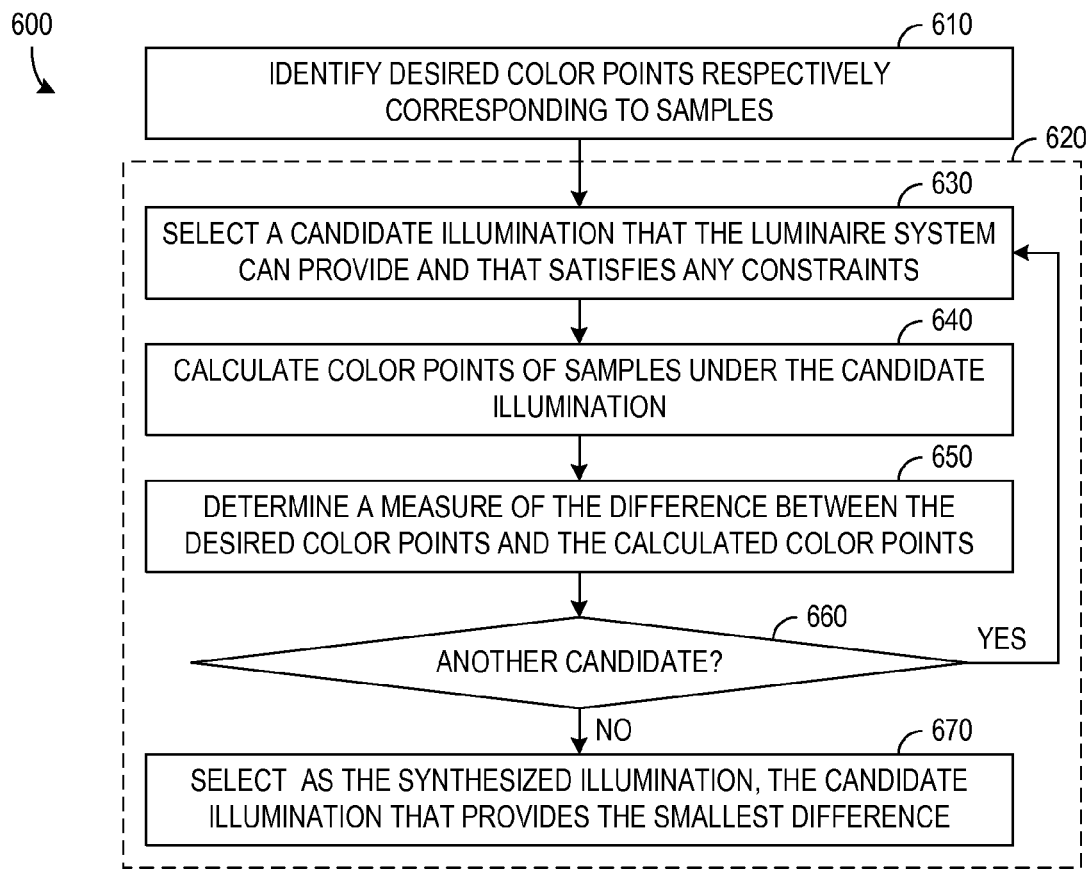
FIG. 6 illustrates a process that synthesizes illumination to minimize a difference between the target colors of samples and the apparent colors of the samples under illumination from a specific luminaire system.

FIG. 6 shows an illumination synthesis process 600 according to one specific implementation that calculates a difference or merit function. Process 600 begins with identifying the target colors for a set of samples, which can be performed as described above. A synthesis process 620 then finds a synthesized illumination that the available luminaire system is able to produce and that gives the samples apparent colors close to the target colors. Synthesis process 620 begins within a block 630 that selects a candidate illumination. The candidate illumination is an illumination that the available luminaire system can produce and, for example, may be defined by a set of drive levels for the color channels of the specific luminaire that may be used to illuminate the environment. Any initial candidate illumination or drive levels could be employed.

Figure 7:
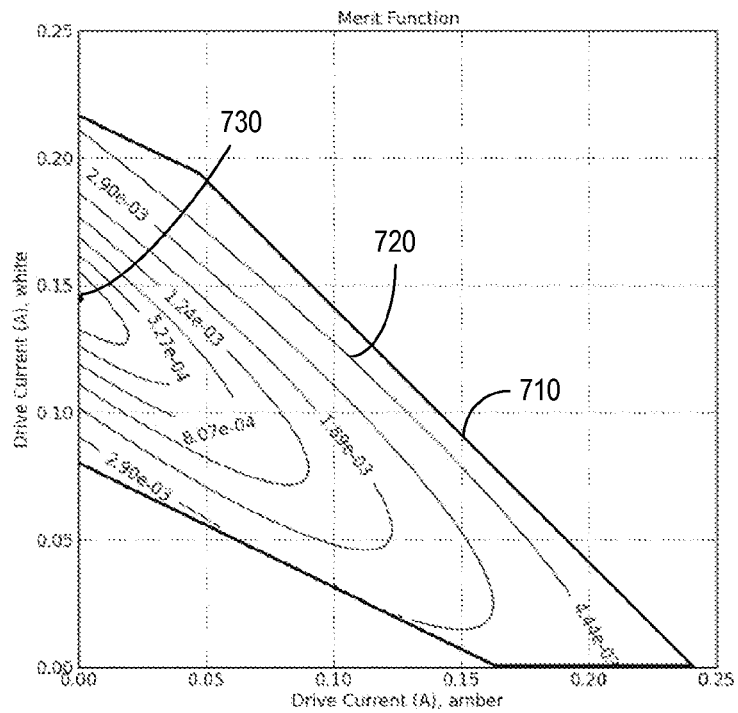
FIG. 7 is a contour map showing the dependence of a merit function on drive levels and illustrating the effect that a constraint has on permitted drive levels of candidates for a synthesized illumination.

In one specific example, block 630 may constrain the initial and subsequent candidate drive levels to drive levels that produce candidate illuminations that in some manner match a target illumination. Candidate illuminations may, for example, be constrained to have color that matches the color of the target illumination. Such a constraint reduces the number of degrees of freedom of selection of candidate illuminations. For example, for a luminaire system having five channels and unconstrained candidates have five degrees of freedom corresponding to the five independent drive levels for the light channels. Constraining the color of the candidate illumination to be the same as the color of the target illumination removes three degrees of freedom if the colors are defined by tristimulus values. In another formulation, luminous flux and a color point in a particular two-dimensional color space, of the candidate illumination is constrained to those of the target illumination. For the 5-channel luminaire, block 630 can choose a candidate illumination by selecting two drive levels and calculating the other three drive levels based on the color constraint. The constraint may further place limits within the available degrees of freedom. FIG. 7, for example, shows a region boundary 710 for drive levels on amber and white light channels in an exemplary 5-channel luminaire that also includes red, green and blue channels, under a constraint that the tristimulus value of the candidate illumination is the same as that of the target illumination. Levels of a merit function are shown by level contours 720, and contour labels correspond to the values of the merit function. If there is no target illumination relevant to the target color points and no other constraints applied, block 630 can select initial and subsequent candidate illuminations in any desired fashion. For example, the initial candidate illumination may be zero illumination or an illumination corresponding to equal values or the drive levels for the color channels of the luminaire system. The initial candidate may also be selected to meet other constraints.

Blocks 640 and 650 evaluate how well the current candidate illumination provides the target colors. In particular, block 640 calculates the color points of the samples under the current candidate illumination. In one implementation, block 640 first determines for each sample a spectral power distribution (SPD) corresponding to light reflected from the sample under illumination by the candidate illumination. As noted above, the power in the reflected SPD at each wavelength of light is a product of the power of the SPD of the candidate illumination at that wavelength and the spectral reflectance of the sample at that wavelength. The reflected or transmitted SPD for a sample can be represented as a function over a continuous range of wavelengths and therefore has an infinite number of degrees of freedom. However, since color as seen by human vision is determined by tristimulus values, the apparent color of the SPD for a sample can be reduced to just three coordinates. Various colorimetric systems calculate tristimulus values corresponding to illumination from a spectral power distribution (SPD) using three color-matching functions (CMFs). Under such colorimetric systems, each tristimulus value may be calculated as scalar products of the CMFs and the SPD. For each scalar product, the relevant CMF and the SPD may both be expressed as vectors having N components. In particular, both the SPD and CMF can be sampled in a certain wavelength range from $\lambda_0$ to $\lambda_{N-1}$ with a wavelength step $\Delta\lambda$, and so $N=1+(\lambda_{N-1}-\lambda_0)/\Delta\lambda$. The wavelength range of interest may correspond to the wavelength range of human vision, for example, from 360 nm to 800 nm. If SPDs and CMFs are sampled with a 5-nm wavelength step, the dimension N of these vectors is equal to 89. A three-component or tristimulus color point t corresponding to a particular N-component SPD vector S can thus be given by Equation 1 where vectors $\bar{t}_1, \bar{t}_2, \bar{t}_3$ are color-matching functions (N-dimensional vectors) and where a scalar product of vectors is shown by angle brackets. The three-component or tristimulus value t is sometimes referred to herein as a color point.

$$t = [\langle S, \bar{t}_1 \rangle \langle S, \bar{t}_2 \rangle \langle S, \bar{t}_3 \rangle] \qquad \text{Equation 1:}$$

Color matching functions or vectors $\bar{t}_1, \bar{t}_2, \bar{t}_3$ can be determined empirically. The most traditional system relies on color matching functions $\bar{x}, \bar{y}, \bar{z}$ based on experimental data from 1931. The notation for the 3-dimensional color point defined through these CMF is (X,Y,Z). There have been various improvements to the 1931 color matching functions since then, notably, 1964 CMFs based on the set of color matching data obtained by Stiles and Burch in 1959. Various nonlinear transformations of three components of color point X, Y, Z have also attempted to make color space more perceptually uniform. Yuv, La*b*, Lu*v* and many other color spaces are all based on color points (X,Y,Z)

where each tristimulus component is derived as scalar product of the SPD and an empirically determined CMF. Block 640 can calculate the color points under the candidate illumination using any of these formalisms but does not require a particular choice of mapping from the reflected SPD to color points and particularly does not require use of particular CMFs. In general, when new experimental data concerning human vision becomes available, further refinements to CMFs may be made, and the methods disclosed herein may use the updated CMFs or other new formalisms.

Block 650 determines a measure of a difference between the target color points for the samples and the color points of samples under the candidate illumination. In one implementation, the difference or merit function relevant to this problem may be an expression based on three-dimensional color points $t^v$ of a set of V samples under synthesized illumination (where index v has V possible values) and three-dimensional target color points $t_t^v$ of the same set of samples. Samples may be chosen using any of the above techniques for any of the above reasons, but for some specific examples, the samples may be color standards such as the pastel colors of Color Rendering Index (CRI) test color set, saturated colors of Color Quality Scale (CQS) set, or custom standards specific to a scene for which illumination is synthesized. CRI and CQS have been developed to calculate color rendering indices. Each index is based on a specific test color samples, so that tabulated data is available for color samples defined by CRI and CQS standards.

Equation 2 expresses an illustrative example of a merit function or difference F between color points $t^v$ of a set of V samples under candidate illumination and target color points $t_t^v$ of the samples. In Equation 2, each parameter $w_v$ is a weight factor associated with the sample having index v. Weight factors $w_v$ may characterize the importance of fidelity of replication of the target color of a specific sample. The colors of the samples may be distributed in color space, and weight factors 142, may also be used to compensate for nonlinearity of the color space.

$$F = \sum_{v=0}^{V-1} w_v (t^v - t_t^v)^2 \quad \text{Equation 2}$$

FIG. 7 shows contour lines 720 corresponding to a merit function F over the permitted region of drive levels within boundary 710. In general, process 600 seeks to find a point 730 that minimizes the merit function F within the permitted or achievable regions of drive levels. The illustrated contour map is a result of the calculation of the merit function defined in Equation 2 for a luminaire having five independently controllable channels including a total of 80 LEDs. The five light channels respectively include red, green, and blue direct LED channels and neutral-white and amber phosphor-converted LED channels. Target color points of color samples correspond to the samples being illuminated by 2000 lumens of illumination characteristic to that of sunlight at sunrise. As discussed above, under the color constraint on the synthesized illumination, the number of the degrees of freedom in a 5-channel system is reduced from five to two. Therefore, just two drive levels, for example, drive levels of white and amber channels, define the spectrum that the luminaire produces. The complete set of five drive levels that meet a color constraint may be referred to as a "solution." For each pair of values of the drive levels on white and amber channels, at most one solution exists, and within the boundary 710 in white-amber drive level axes lies a region of solutions.

A decision block 660 decides whether another candidate illumination needs to be considered after block 650 determines the difference or merit function value F for the previous candidate illumination. The decision of whether to consider another candidate can be made using a number of different criteria. For example, block 660 may decide not to consider another candidate illumination if the merit function is less than a cutoff value indicating that the candidate illumination just considered provides apparent colors of samples that are sufficiently close to the target colors of the samples. Alternatively, block 660 may decide to repeatedly select another candidate illumination until a predetermined number of candidates have been evaluated during respective repetitions of blocks 630 and 640. In yet another alternative implementation, block 660 may decide to repeatedly select another candidate illumination until a selection process converges on a solution such that drive levels of light sources have not changed by more than a predetermined amount over a predetermined number of repetitions.

If block 660 decides that another candidate illumination needs to be evaluated, process 620 jumps back to block 630 where a new candidate illumination is selected, e.g., from within boundary 710 of FIG. 7. Each new candidate selected in block 630 may be selected by systematically or randomly stepping through the possible illuminations that the available luminaire system can produce, e.g., by stepping through settings of drive signals of the light channels of the luminaire system. Block 630 may also use the determined differences or merit functions for the candidates already evaluated and select a new candidate that tends to converge toward a minimum in the difference or merit function.

If block 660 decides that another candidate illumination does not need to be evaluated, process 620 proceeds to block 670, which may select as the synthesized illumination, the evaluated candidate illumination that provides the smallest difference between the target color points for the samples and the color points of samples under any of the evaluated candidate illuminations. Selection in block 670 can be made without regard to color rendering indices or a correlated color temperature of the synthesized illumination and even without regard to whether color rendering indices or a correlated color temperature is defined for the synthesized illumination. The synthesis method can thus be applied to find a synthesized illumination that is other than white light.

A special case of light synthesis process 600 is sometimes referred to herein as the light replication problem. For the light replication problem, a synthesized illumination from a luminaire system is desired to provide samples with the same colors that would be provided under a target illumination to be replicated. Process 600 as described above can provide the best results at a minimum of the merit function under the constraint that the synthesized illumination can be produced by the available luminaire system. Further in the case of light replication, the minimum of the merit function may be found under a further constraint that color points of the synthesized illumination and the target illumination are coincident, within a predetermined accuracy. This constraint reflects a reasonable requirement or goal that, when one looks at sources of the synthesized and target illuminations, the sources look as close to identical as possible. In process 600 of FIG. 6, this further constraint can be realized by limiting the candidate illuminations selected in block 630 to candidate illuminations having color points that differ from the color point of the target illumination by no more than a cutoff difference.

The example of a quadratic merit function F such as given in Equation 2 allows for a more mathematical description of a specific minimization process. For this example and for compactness of expressions (but without loss of generality), all weights $w_v$ for index v from 0 to V−1 may be set unity, giving a merit function F of the form of Equation 3A. In Equation 3, $r_a$ is a 3V-component vector formed from the components of tristimulus color points $t^v$, and $r_t$ is a 3V-component vector formed from the components of target tristimulus color points $t_t^v$. In general, a 3V-component color vector r may be formed as a list of tristimulus values of color samples under a particular illumination, as shown in Equation 3B.

$$F = |r_a - r_t|^2 \qquad \text{Equation 3A:}$$

$$r = [t^0 \cdots t^{V-1}]^T \qquad \text{Equation 3B:}$$

The merit function F of Equation 3A has an obvious minimum at $r_a = r_t$, but that exact solution may not be available under the possible luminations from a luminaire system. Accordingly, a synthesized illumination that provides a best or satisfactory value for apparent color vector $r_a$ may be sought from among the available illuminations that a luminaire system can provide. The capabilities of the luminaire system determine the minimum value for merit function F. In one particular implementation of the replication problem, another constraint for the minimization of the merit function F (in addition to limitations of the luminaire system) may be that color points of synthesized and target illumination are coincident, within a predetermined accuracy, e.g., $|t - t_t| \leq \delta$ where t and $t_t$ are the color points of the synthesized illumination and the target illumination and $\delta$ is a constant or limit value. This constraint reflects a reasonable requirement that, when one looks at sources of synthesized and target illuminations, the synthesized and target illuminations should look as close to identical as possible.

Sample target color vector $r_t$ and the color point $t_t$ of the target illumination may be given quantities for the replication problem. For example, a user may select or provide such quantities by selecting preferences for a synthesis process. Target color vector $r_t$ and the color point $t_t$ could alternatively be calculated quantities, for example, results found in processes such as described above with reference to FIGS. 3 and 4. In either case, a desired spectral power distribution may be represented by sample target color vector $r_t$ and the color point $t_t$.

Sample apparent colors vector $r_a$ may be calculated based on the illumination S from a luminaire system and reflectances f of the samples of interest. The illumination S from a particular luminaire system can formally describe as a sum of the spectral power distributions of the M emitters as given in Equation 4. In Equation 4, $k_m$ is a drive level for the light channel having an index m, and $s_m$ represent a normalized spectral power distribution for light channel m, e.g., a measured spectral power distribution for a light channel divided by the drive level for the light channel. For luminaire 120 or 220 of FIG. 1 or 2, each normalized spectrum $s_m$ may be among the recorded channel spectral power distributions 164. In general, the radiant power from a light channel may be a nonlinear function of the drive level, so the normalized distribution $s_m$ may be a function of $k_m$, for example, in the case of an LED driven by DC current.

$$S = \Sigma_{m=0}^{M-1} k_m s_m \qquad \text{Equation 4:}$$

Apparent color vector $r_a$ used in Equation 3A has 3V components formed from $t_a^v$, each of which is a tristimulus color point. Tristimulus value $t_a^v$ that enters the apparent color vector $r_a$ corresponding to an index v can be found, as shown in Equation 1, from scalar products of the color matching functions $\bar{x}$, $\bar{y}$, and $\bar{z}$ with a wavelength-by-wavelength product of synthesized illumination spectrum S and a reflectance $f^v$ of sample v. Equation 5 further introduces a constant 3V×M matrix R of 3V-component color vectors that may be calculated from the spectral reflectances $f^v$ of the V samples, the normalized spectral power distributions $s_m$ for index m from 0 to M−1, and color matching functions $\bar{x}$, $\bar{y}$, and $\bar{z}$. Merit function F may thus be reformulated in terms of variable drive levels $k_m$ or of a variable drive vector k as in Equation 6.

$$R = [r_0 \ldots r_{M-1}] \qquad \text{Equation 5:}$$

$$F = |Rk - r_t|^2 \qquad \text{Equation 6:}$$

The synthesis of illumination S can result from finding values of drive levels $k_m$ that minimize merit function F under the constraints that the drive levels $k_m$ are positive values and cannot exceed the maximum values for each channel $K_m$ that the drivers of the luminaire system can supply. In some cases, as noted above, the minimization is under an additional constraint that the color points $t_t$ and t of target and synthesized illumination are the same within an accuracy δ. One method of handling this constraint is mathematically the same as adding, with a certain weight, another sample having uniform reflectance or transmittance for all wavelengths and a target color point $t_t$ for the added "sample" that is the same as the color point of the target illumination. Equation 7 shows a merit function F based on Equation 6 but modified to include a term corresponding to the constraint on the color point $t_t$ of the synthesized illumination. In Equation 7, W is a weight factor, and T is a constant 3 by M matrix of three-component color points that may be calculated from scalar products of the normalized spectral power distributions $s_m$ for index m from 0 to M−1 and color matching functions $\bar{x}$, $\bar{y}$, and $\bar{z}$.

$$F = |Rk - r_t|^2 + W|Tk - t_t|^2 \qquad \text{Equation 7:}$$

Figure 8:
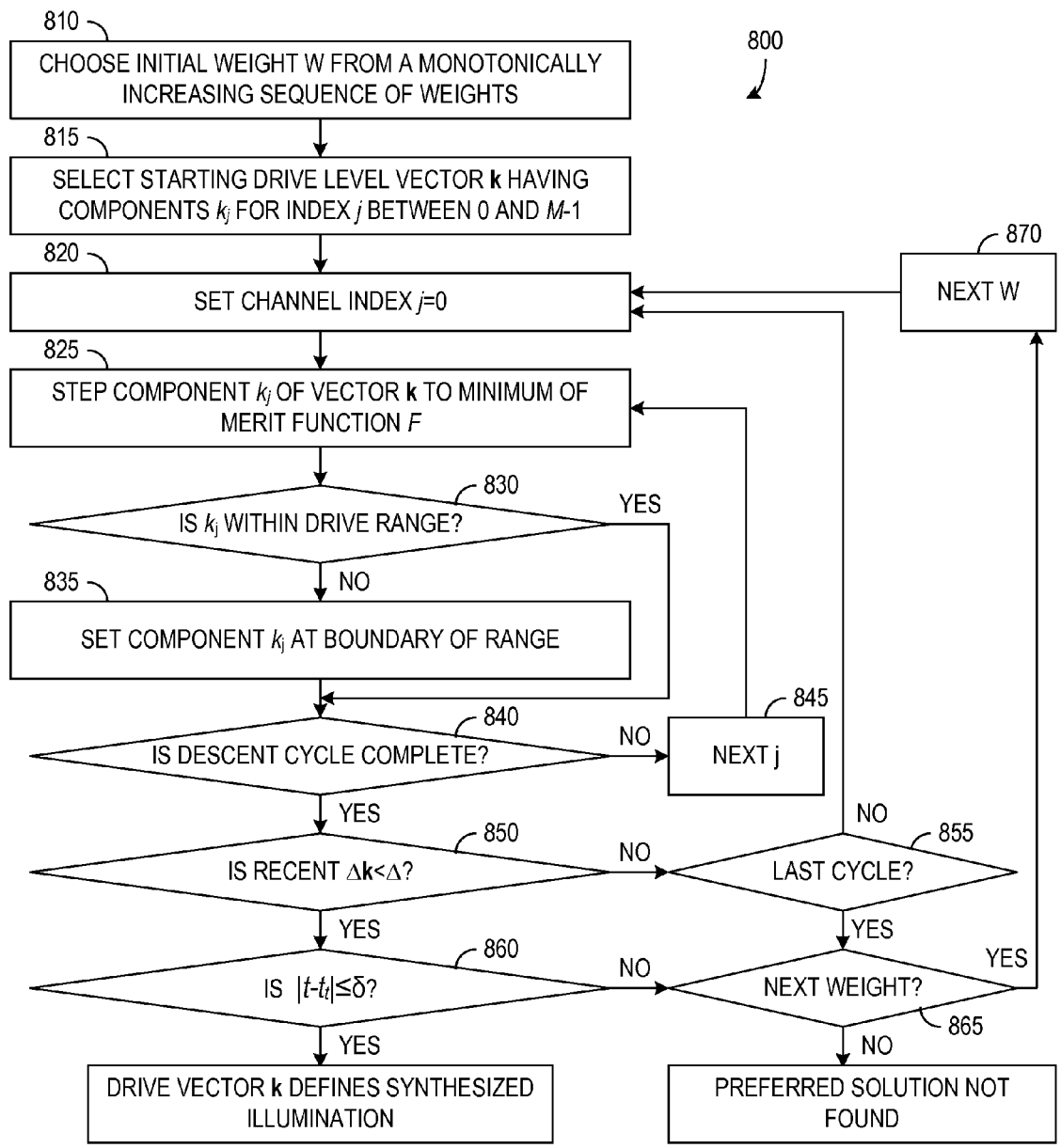
FIG. 8 illustrates a process for identifying drive levels of a synthesized illumination.

FIG. 8 is a flow diagram of a process 800 for finding drive settings of a luminaire system. Process 800 particularly synthesizes an illumination S that suitably minimizes the merit function F given in Equation 7. The description of process 800 is intended to provide greater detail of a specific process and particularly employs the mathematical terminology described above, but such details are illustrative and are not necessarily required.

Process 800 starts in a block 810 that chooses an initial value for the weight W from a monotonically increasing sequence of weights. In general, process 800 aims at finding a minimum for merit function F, but specific color samples v will generally have apparent colors $t^v$ that differ from their target colors $t_t^v$. Similarly, color point t of the synthesized illumination may differ from target color point $t_t$. Weight factor W effectively controls the importance of apparent illumination color t being close to target illumination color $t_t$. Block 810 may start with a modest weight, e.g., W=1, and process 800 as described further below can then determine whether that weight W leads to a satisfactory synthesized illumination.

Block 815 of process 800 selects an initial value for a drive vector k, which has components that are drive levels $k_j$ for index j from 0 to M−1 where M is the number of light channels available in the luminaire system. Block 815 may, for example, set all drive levels $k_j$ initially to zero. A block 820 then initializes a channel index j.

A block 825 steps drive level $k_j$ to the value that minimizes merit function F with the current value of weight W, while all other drive levels are kept constant. In particular, the merit function F defined above has a minimum along the direction of drive level $k_j$ at which the partial derivative of merit function F with respect to drive level $k_j$ is zero. The step along drive level $k_j$ taken in block 825 may take drive vector k outside of it permitted range, e.g., component drive level $k_j$ may become negative or greater than the maximum permit drive level. Decision step 830 determines whether the luminaire system permits the new drive vector k. If not, a block 835 sets component drive level $k_j$ at the boundary of the permitted range, e.g., 0 or a maximum drive level value, whichever is closer to the determined new drive level $k_j$. A descent cycle can similarly move all of the component drive levels in order to minimize merit function F to the extent consistent with the available drive levels of the luminaire system, and a decision block 840 determines whether a descent cycle is complete. If not, a block 845 sets index j to its next value, and process returns to block 825 to step the next drive level $k_j$ toward the minimum of the merit function F.

Multiple descent cycles may be needed to find a minimum for merit function F with a particular weight factor W. Decision step 850 determines whether stepping of the drive levels has reached a suitable minimum. In particular, if the magnitude $|\Delta k|$ of the change $\Delta k$ in drive vector k during a predetermined number of prior descent cycles is less than or equal to some cutoff $\Delta$, drive vector k may be close to a minimum in merit function F. If the drive vector k has recently changed more than the cutoff $\Delta$, another predetermined number of descent cycles may need to be performed, and process 800 jumps from decision block 850 to a decision block 855, which determines whether another descent cycle should be performed. If so, process 800 jumps from decision block 855 back to block 820 for the next descent cycle. Block 855 may limit the number of descent cycles to a fixed number, so that reaching a last descent cycle indicates a failure to find a preferred solution.

If block 850 determines that recent descent cycles have not significantly changed drive vector k, process 800 branches from block 850 to decision block 860. Decision block 860 then determines whether the current drive vector k provides synthesized illumination with an apparent color point t close to the target color point $t_t$ for the illumination, e.g., $|t-t_t| \le \delta$ within a predetermined accuracy $\delta$. If so, the current drive vector k defines a synthesized illumination that provides an acceptable minimization of merit function F and an acceptable illumination color point t, and process is complete. If decision block 860 determines that apparent color point t is not sufficiently close to the target color point $t_t$ for the illumination, process 800 branches from decision block 860 to decision block 865 and determines whether another weight W should be tried in merit function F. In particular, a block 870 can choose the next larger weight from the sequence chosen in block 810, and process 800 can return to block 820 to begin descent cycles for merit function F with the new weight W. If decision step 865 determines all weights have been tried, process 800 may end without finding a preferred solution for the synthesized illumination.

Figure 9A:
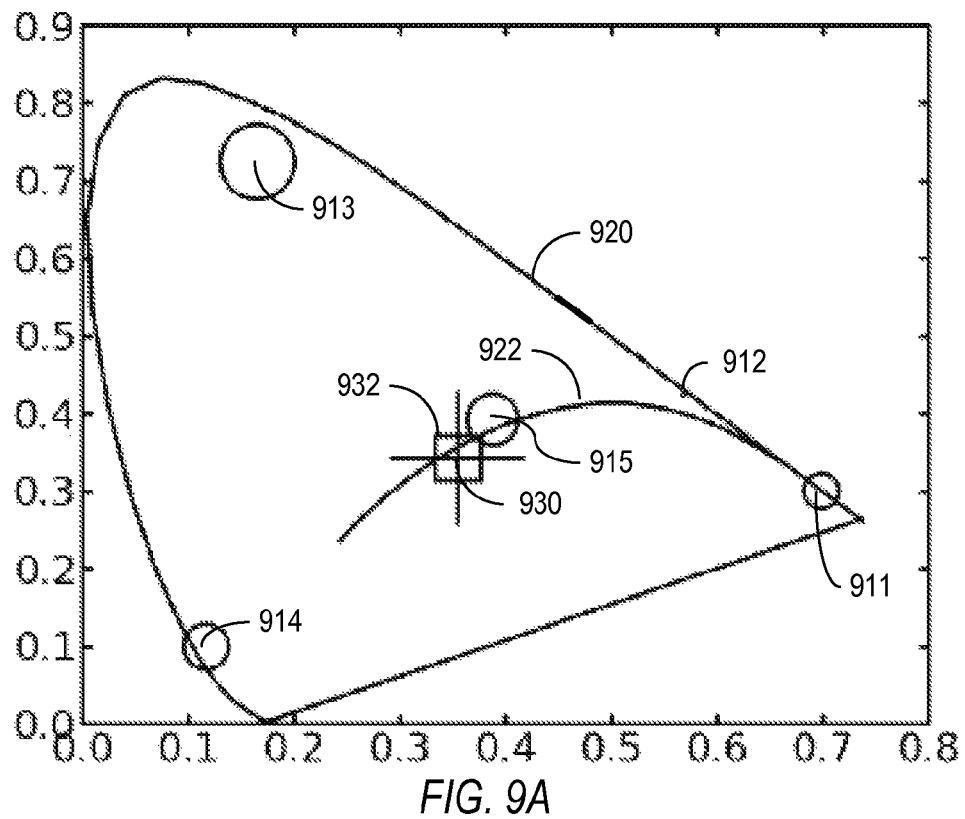
FIG. 9A illustrates color points and drive levels on a chromaticity diagram for five light channels that collectively produce the synthesized spectral power distribution.

FIG. 9A shows a chromaticity diagram to graphically illustrate a solution for a synthesized illumination from a 5-channel luminaire system. The luminaire system and the target illumination in this example are the same as the ones for which the merit function contour map was calculated and shown in FIG. 7. The synthesized illumination contains contributions from light channels having respective color points 911 to 915. The three light channels corresponding to color points 911, 913, and 914 may be have narrow spectral power distributions, e.g., close to monochromatic, and have color points near a boundary 920 of the CIE chromaticity diagram. In the illustration, these are red channel 911, green 913, and blue 914. The light channel corresponding to color point 912 is phosphor-converted amber, and the channel corresponding to 915 is phosphor-converted white. This fifth light channel corresponding to color point 915 has a relatively broad spectral power distribution, and color point 915 is near the black body locus 922. In FIG. 9A, circles around the color points 911 to 915 indicate the relative sizes of the respective drive levels for light channels when producing the synthesized illumination. In this particular example, the drive currents are as follows: red 98 mA, green 212 mA, blue 128 mA, white 144 mA, and amber 0 mA. Thus, the light channel corresponding to color point 912 may be off while the luminaire system produces the synthesized illumination. A color point 930 represents the color point of the target illumination, and the apparent color point of the synthesized illumination is indicated by a square 932 which landed within 0.1 (x, y) color point of 930 for this synthesized illumination. Returning to FIG. 7 we note that the minimum value of the merit function was found by direct calculation on a mesh grid of white and amber drive levels, at drive levels around 145 mA (white) and 0 mA (amber), in agreement with the optimization solution illustrated in FIG. 9A.

Figure 9B:
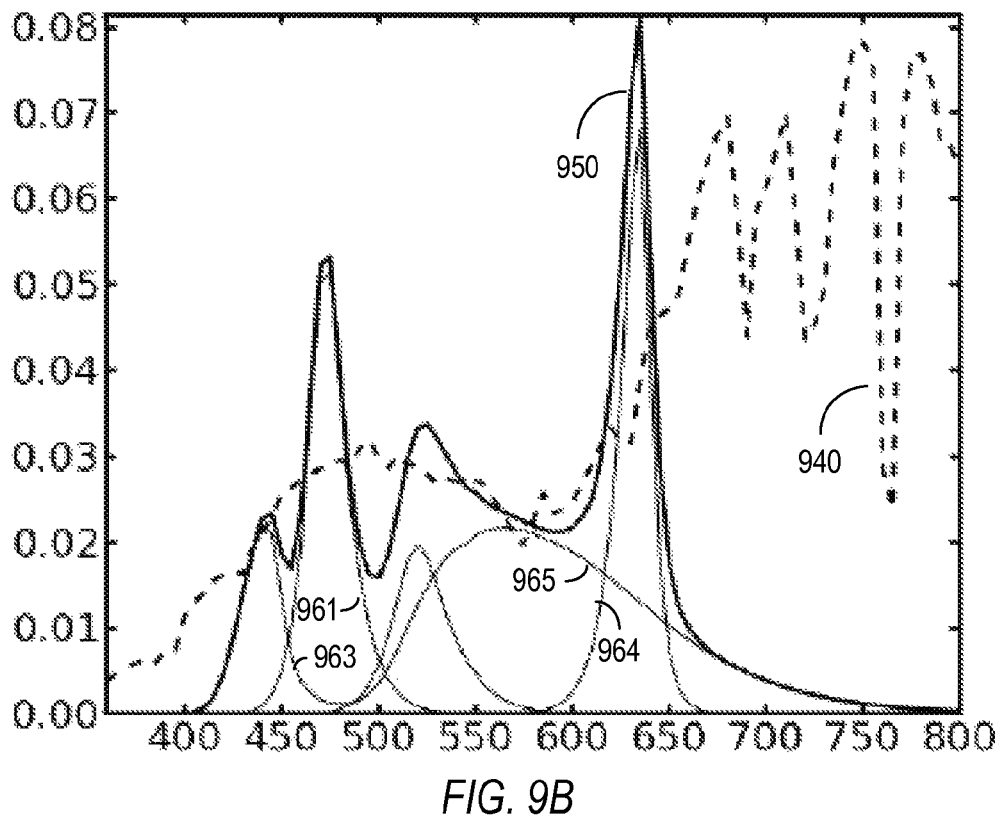
FIG. 9B shows a target spectral distribution and a synthesized spectral power distribution from a 5-channel luminaire system as in FIG. 9A.
Figures 9C, 10:
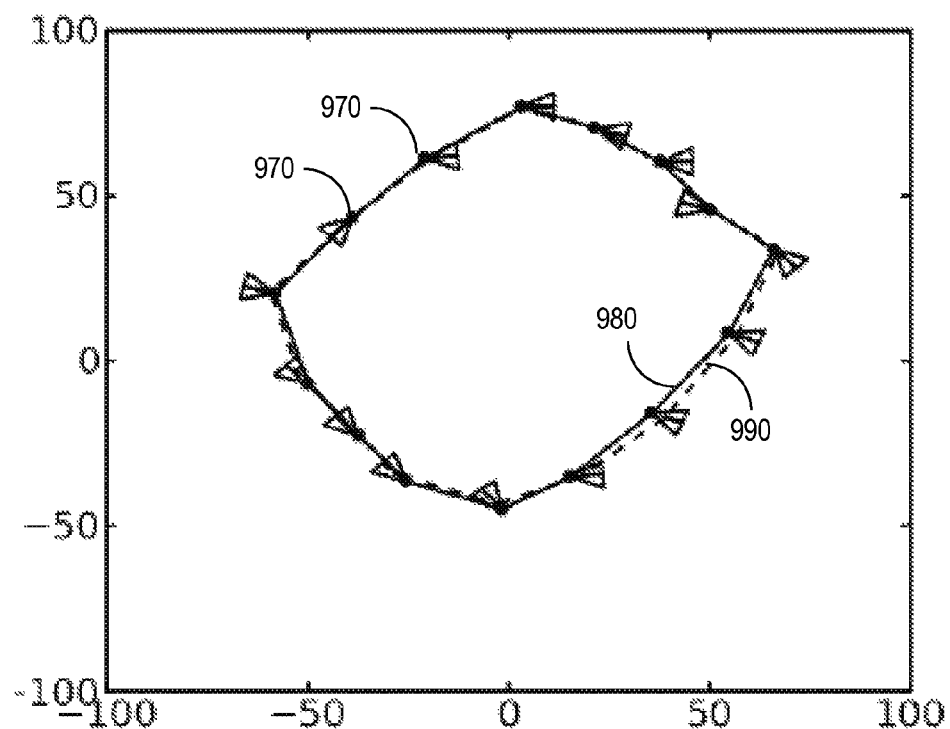
FIG. 9C illustrates differences between target color points of a set of samples and apparent color points of the samples under the synthesized illumination of FIGS. 9A and 9B.
FIG. 10 illustrates a data structure that represents a spectral power distribution using photometric characteristics such as color points for the spectral distribution and for a set of samples.

FIG. 9B shows a target spectral distribution 940 and a synthesized spectral distribution 950 corresponding to the chromaticity diagram of FIG. 9A. As shown, synthesized spectral distribution 950 is a combination of spectral distributions 961, 963, 964, and 965 from light channels having color points 911, 913, 914, and 915. Spectral distribution 950 of the synthesized illumination is similar to the target spectral distribution 940 over an important range of wavelengths between about 400 nm and 700 nm but differs from target spectral distribution 940 even in that range. FIG. 9C, however, shows apparent color points 970 of fifteen samples of the CQS color set under the synthesized illumination that when plotted in L*a*b* color space differ only slightly from the target colors for the samples. In FIG. 9C, a plot 980 (shown with a solid line) connecting the apparent color points 970 differs only slightly from a plot 990 (shown with a dashed line) connecting the target color points for the samples at the target illumination. (Arrow heads in FIG. 9C are exaggerated to illustrate the direction of the difference.) Accordingly, an illumination synthesized to achieve apparent color points for samples may provide performance approximating the performance of the target illumination.

Color points used in the manner described above to determine a synthesized illumination can also provide advantages in methods for representing a desired spectral distribution. In particular, spectral distributions are continuous functions, and representing a spectral distribution using discrete samples of the function in 5-nm wavelength step across the visible spectrum requires approximately 89 data values, e.g., floating point numbers. In contrast, a representation of a spectral distribution using the target color point for the spectral distribution and the target color points for set of standard samples may provide a more compact representation. FIG. 10, for example, shows a data structure 1000 representing a spectral distribution using color points for a target color point for the spectral distribution and target color points for set of standard samples. If nine standard samples are used, data structure 1000 may include thirty data values including three data values for the target color point of the spectral distribution and three data values for each of nine color points corresponding to the nine samples. A representation using sampling of the spectral distribution or color points is independent of particular luminaire structure, e.g., independent of the number M or characteristics of the light channels in the luminaire, and the techniques described above can convert either representation into luminaire specific drive levels. However, the representation using color points as shown in FIG. 10 can reduces data storage and bandwidth requirements for storing or transmitting data representing spectral distributions.

Table 1 illustrates the relative data requirements of different representations of spectral power distributions in a luminaire system. In particular, a sampled spectral distribution requires the most data to represent but is already in a form suitable for many calculations. A representation using color points and nine samples contains less data but requires color matching functions and optical metrics of the test samples for conversion of the representation to a sampled spectral power distribution. A representation that uses drive levels for a reference luminaire system, e.g., a luminaire with six light channels, contain the least data but requires that the luminaire system know the normalized spectral power distributions for the light channels of the reference luminaire.

TABLE 1

| Representation Type | Number of Data Values in Representation | Luminaire Data needed to Convert Representation to SPD |
|---|---|---|
| Sampled Spectral Distribution | 89 | None |
| Target Color Points | 30 | CMFs, Sample Data |
| Standard Drive Values | 6 | Normalized Channel SPDs for Reference Luminaire |

Some embodiments of the above invention may be implemented in a computer-readable media, e.g., a non-transient media, such as an optical or magnetic disk, a memory card, or other solid state storage containing instructions that a computing device can execute in order to perform specific processes that are described herein. Such media may further be or be contained in a server or other device connected to a network such as the Internet that provides for the downloading of data and executable instructions.

Although particular implementations have been disclosed, these implementations are only examples and should not be taken as limitations. Various adaptations and combinations of features of the implementations disclosed are within the scope of the following claims.

What is claimed is:

1. A method of operating a lighting system that includes a plurality of light sources, the method comprising:
   using a computing system to identify a plurality of intensities respectively for the lights sources, wherein identifying the intensities includes determining a difference between target colors respectively of a set of samples and apparent colors of the samples under a combined illumination that results from the light sources respectively operating at the intensities; and
   operating the light sources respectively at the intensities to illuminate an environment.

2. The method of claim 1, wherein identifying the intensities comprises finding the intensities that minimize the difference.

3. The method of claim 1, further comprising determining second apparent colors of the samples under a target illumination, and using the second apparent colors in a process that selects the target colors of the samples.

4. The method of claim 3, wherein the process that selects the target colors of the samples comprises determining a modification of the second apparent colors, and selecting the target colors to be the second apparent colors with the modification.

5. The method of claim 4, wherein the modification compensates for fading of one or more of the samples, and the target colors correspond to third apparent colors that the samples would have had under the target illumination before the fading.

6. The method of claim 3, wherein the combined illumination minimizes the difference between the target colors of the samples and the apparent colors of the samples subject to a constraint on a difference between a color space coordinate of the combined illumination and a color space coordinate of the target illumination.

7. The method of claim 1, wherein identifying the intensities employs spectral reflectances or transmittance of the samples to calculate the apparent colors of the samples under the combined illuminations.

8. The method of claim 7, further comprising measuring the spectral reflectances or transmittances of one or more of the samples while the samples are in the environment illuminated by the lighting system.

9. The method of claim 7, wherein a public standard defines the spectral reflectances or transmittances one or more of the samples.

10. The method of claim 1, wherein identifying the intensities comprises-minimizing distances in color space between the target colors of the samples and apparent colors of the samples under illuminations that the lighting system is able to produce.

11. The method of claim 1, wherein the difference comprises a weighted sum of distances between tristimulus values of the target colors and tristimulus values of the apparent colors.

12. The method of claim 1, wherein identifying the intensities does not constrain the combined illumination to having a correlated color temperature.

13. The method of claim 1, wherein the target colors of the samples are apparent colors that the samples have under a target illumination.

14. The method of claim 1, further comprising for each of a plurality of candidate illuminations, determining a difference between the target colors of the samples-and apparent colors of the samples under the candidate illumination, wherein each of the candidate illuminations results from the light sources operating at a different set of candidate intensities, and the combined illumination is one of the candidate illuminations provides a smallest of the differences.

15. The method of claim 14, wherein the candidate illuminations are constrained so that respective values of a color space coordinate of the candidate illuminations match a value of the color space coordinate of a target illumination.

16. The method of claim 15, wherein the candidate illuminations are constrained so that luminous flux of the candidate illuminations match a luminous flux of a target illumination.

17. The method of claim 8, wherein a sensor in the lighting system measures the spectral reflectances or transmittance of the samples.

18. The method of claim 1, further comprising a user selecting the target colors according to personal preferences.

* * * * *